US008814076B2

(12) United States Patent
Ingvarsson et al.

(10) Patent No.: US 8,814,076 B2
(45) Date of Patent: Aug. 26, 2014

(54) ROLL ARRANGEMENT

(71) Applicants: Kjell Ingvarsson, Skultuna (SE); Ulf A. Lifvenborg, Vasteras (SE); Lars Jonsson, Vasteras (SE); Jesper Kiersgaard, Vasteras (SE); Kenneth Grefve, Vasteras (SE); Joar Johansson, Solna (SE)

(72) Inventors: Kjell Ingvarsson, Skultuna (SE); Ulf A. Lifvenborg, Vasteras (SE); Lars Jonsson, Vasteras (SE); Jesper Kiersgaard, Vasteras (SE); Kenneth Grefve, Vasteras (SE); Joar Johansson, Solna (SE)

(73) Assignee: ABB AB (SE)

( * ) Notice: Subject to any disclaimer, the term of this patent is extended or adjusted under 35 U.S.C. 154(b) by 0 days.

(21) Appl. No.: 13/871,704

(22) Filed: Apr. 26, 2013

(65) Prior Publication Data
US 2013/0233959 A1 Sep. 12, 2013

Related U.S. Application Data

(63) Continuation of application No. PCT/EP2011/068507, filed on Oct. 24, 2011.

(30) Foreign Application Priority Data

Oct. 27, 2010 (EP) .................................... 10189047

(51) Int. Cl.
*B65H 59/38* (2006.01)
(52) U.S. Cl.
USPC ...................... 242/413; 242/413.1; 242/413.3
(58) Field of Classification Search
USPC ............. 242/413, 413.1, 413.3, 418.1, 419.1, 242/420.6, 421.5
See application file for complete search history.

(56) References Cited

U.S. PATENT DOCUMENTS

| | | | |
|---|---|---|---|
| 5,285,684 A * | 2/1994 | Uesugi et al. ................... 73/159 |
| 5,629,487 A | 5/1997 | Mucke et al. |
| 6,354,013 B1 | 3/2002 | Mucke et al. |
| 6,606,919 B2 * | 8/2003 | Perenon et al. .......... 73/862.453 |
| 7,089,771 B2 * | 8/2006 | Mucke et al. .................. 72/10.4 |
| 7,118,062 B2 * | 10/2006 | Vaidyanathan et al. ... 242/412.1 |
| 2002/0092365 A1 | 7/2002 | Perenon et al. |
| 2004/0030429 A1 | 2/2004 | Baba et al. |
| 2004/0030439 A1 | 2/2004 | Vaidyanathan et al. |

FOREIGN PATENT DOCUMENTS

| DE | 29721085 U1 | 1/1998 |
|---|---|---|
| WO | 8402121 A1 | 6/1984 |

OTHER PUBLICATIONS

European Search Report Application No. EP 10 18 9047 Completed: Mar. 3, 2011; Mailing Date: Mar. 11, 2011 5 pages.
International Preliminary Report on Patentability Application No. PCT/EP2011/068507 Completed: Nov. 14, 2012 15 pages.
International Search Report & Written Opinion of the International Searching Authority Application No. PCT/EP2011/068507 Completed: Jan. 30, 2012; Mailing Date: Feb. 6, 2012 9 pages.

* cited by examiner

*Primary Examiner* — Sang Kim
(74) *Attorney, Agent, or Firm* — St. Onge Steward Johnston & Reens, LLC (57) ABSTRACT

A roll arrangement for determining a web tension profile of a web. The roll arrangement includes a roll having a peripheral surface for guiding the web, which peripheral surface is provided with a plurality of openings, and a plurality of sensor arrangements. Each of the plurality of openings are arranged to receive one sensor arrangement of the plurality of sensor arrangements to thereby sense forces applied by the web to the roll. The roll arrangement is adapted to suspend the sensor arrangements in the respective opening.

11 Claims, 8 Drawing Sheets

ROLL ARRANGEMENT

FIELD OF THE INVENTION

The invention generally relates to a roll arrangement, and in particular to a roll arrangement comprising a roll and a plurality of sensors arranged in openings of the roll for determining a web tension profile of a web which may be applied to the roll.

BACKGROUND OF THE INVENTION

In paper manufacturing, printing, or similar applications involving a traveling web, a plurality of rolls are typically utilized for controlling the traveling path of the web.

In order to be able to provide a web product having an even quality across its width, it is typically desirable to determine a web tension profile of the web across its width when the web is in contact with the peripheral surface of a rotating roll. By determining the web tension profile of the web and by evaluating the web tension profile, the tension applied by the web to the roll may be controlled so as to obtain an even tension across the width of the web when in contact with the roll. As a result, a higher quality web may be provided.

In order to be able to measure the web tension profile of the web, sensors may be arranged on the roll for sensing the forces applied by the web on the peripheral surface of the roll. The sensors provide signals which may be evaluated for determining the web tension profile of the web. However, rolls having sensors on the peripheral surface suffer from several disadvantages, such as the sensors protruding from the surface, which necessitates coating of the roll to provide a smooth roll surface.

Sensors may also be implanted in the surface of the roll, as described in US 2004/0030439. US 2004/0030439 discloses a system for detecting the normal force exerted by a web material around the circumferential surface of a cylinder. Multiple sensors may be implanted in the cylinder surface. The cylinder surface may be machined to contain a recess, a cavity or a slot that fits the sensor. The sensor may be disposed in the recess such that the sensor's force-sensitive surface is flush with the cylinder surface.

However, there are drawbacks with the teachings of US 2004/0030439. For instance, the measured web tension profile may be contaminated by various inherent properties of the cylinder. In particular, the system of US 2004/0030439, which is for printing applications, would not be suitable for wide-body cylinder rolls used e.g. in the paper manufacturing industry.

SUMMARY OF THE INVENTION

Difficulties that arise in measuring the web tension profile of a web include the measuring of forces having a small magnitude, e.g. in the order of a few Newton. The cylinder body of a roll for e.g. paper manufacturing is generally very large. The axial length of such a roll may for instance be up to 10 meters or more. A cylinder body of such size, when arranged on an axial shaft around which it may rotate, will be deflected by means of the gravitational force. When the roll rotates, an oscillation of the deflection will arise in the sensors, contaminating any measurements by the sensors arranged on, or in the cylinder surface. This makes it very difficult to measure web tension forces of only a few Newton. Furthermore, thermal expansion of the roll may also contaminate the measurements.

In view of the above, a general object of the present invention is to provide an improved roll arrangement for determining a more accurate web tension profile of a web applied to the roll arrangement.

Another object is to provide a roll arrangement in which web tension measurements are less affected by variations in the roll surface such as thermal expansion and axial roll deflection due to the width of the roll.

Hereto, in a first aspect of the present invention, there is provided a roll arrangement for determining a web tension profile of a web, the roll arrangement comprising: a roll having a peripheral surface for guiding the web, which peripheral surface is provided with a plurality of openings, and a plurality of sensor arrangements, each of the plurality of openings being arranged to receive one sensor arrangement of the plurality of sensor arrangements to thereby sense forces applied by the web to the roll, wherein the roll arrangement is adapted to suspend the sensor arrangements in the respective opening.

Hence, the above objects are solved by suspending the sensor arrangements in the openings of the roll. Thereby the sensor arrangements are disengaged from the roll body in the sense that they only have contact with the roll at their suspension.

Beneficially, the sensor arrangements, and thus the sensors, will be less affected by the dynamics of the material of the roll, such as thermal expansion and axial roll deflection. Hence, a roll arrangement which is free, or at least less effected by the forces in the peripheral surface of the roll i.e. forces which are not directly derivable from the web tension, may be obtained. As a result, the measurements of the tension applied by a web to the roll may more accurately be determined. Consequently, a higher quality web product may be provided.

By suspension of a sensor arrangement is generally meant that a back surface of the sensor arrangement, i.e. a surface facing away from the peripheral surface of the roll when the sensor is arranged in an opening, is not in direct contact with any portion of the roll located radially inwards from the back surface of the sensor housing. Thus, a back surface of a sensor arrangement is generally not resting on a surface of the roll.

The roll may have sensor arrangement suspending means associated with each opening for suspending a sensor arrangement thereto.

Each sensor arrangement may comprise a sensor and a sensor housing having a sensing surface that forms part of the peripheral surface of the roll when the sensor arrangement is arranged in an opening of the roll.

By arranging each sensor in a housing where the housing provides the effective sensing surface against the web, the sensor reacts on small deformations in the sensing surface, because the sensing surface of the housing is rigid compared to the sensor membrane of the sensor fitted in the sensor housing, thus making the sensing surface stiff.

Each sensor arrangement may have suspending means adapted to be fastened to a sensor arrangement suspending means to thereby suspend the sensor arrangement on the roll.

Each suspending means may define lateral portions on opposite sides of a sensor arrangement.

Beneficially, the suspending means may comprise two laterally arranged roll contact surfaces, in the same plane, for suspending the sensor arrangement to the roll. Thereby minimal contact with the roll surface may be provided and thus the influence of thermal and gravitational deformation of the roll on the sensor arrangement may be minimized.

The suspending means for each sensor arrangement may be arranged in a radial plane of the roll when the sensor arrangement is arranged in an opening. Thereby the axial deflection of the roll has lower impact on the sensor arrangement.

Each sensor may be arranged centered between the suspending means in a sensor housing. Thus the tensional forces due to e.g. axial deflection of the roll may be equally distributed in the sensor arrangement, and the movement of the suspending means of the sensor arrangement due to e.g. axial deflection may affect the measurements minimally.

Each sensor may be arranged in a sensor housing between two facing surfaces aligned with each other and arranged at different radial distances from a center of the roll.

The sensor arrangement may comprise a base member which presents the inner surface of the two facing surfaces, and at least one bridge member, wherein the sensing member is mechanically coupled to the base member only via the at least one bridge member and the sensor. The sensing member may thereby more efficiently be mechanically disengaged from the suspending means of the sensor arrangement, which suspending means may be subject to movement due to e.g. axial deflection of the roll.

The openings may be arranged in a plurality of axially extending rows along the peripheral surface of the roll.

Each sensing surface may substantially be in level with the peripheral surface when the sensor arrangements are arranged in the respective opening. By designing the sensor arrangements such that sensing surface is substantially flush with the peripheral surface of the roll, and due to the rigidity of the sensor housing, the sensing surfaces of the sensor housings may define part of the peripheral surface of the roll. In particular, due to the rigidity of the sensing surface, it is envisaged that no coating of the roll may be needed for its operation.

The rows may be arranged around the peripheral surface in such a way that each pair of adjacent rows has the same angular displacement. Such a design provides symmetry whereby minimal variation in deformation of the roll may be obtained.

The openings of each row may be axially displaced relative the openings of any other row of the plurality of rows. It may thereby be possible to determine which sensor in each cross section of the substantially cylindrical roll it is that provides measurement data. This is beneficial if all four sensors (in embodiments having four rows of sensors and thus four rows of openings) in a cross section of the roll provide measured data via one mutual communications link. The particular sensor to which the measured data pertains may thereby be determined by computing devices used e.g. for determining the web tension profile by analyzing e.g. the time delay, due to the axial displacement, of the received data.

The openings in each row may be distributed from a first end of the roll to an opposite second end of the roll. Thereby the complete web tension profile across the width of the web may be determined.

Each sensor arrangement may comprise a magnetoelastic sensor. The sensors may hence utilize the Villari effect, i.e. the change in magnetization due to applied stress.

Alternatively, each sensor arrangement may comprise a piezoelectric sensor.

Alternatively, each sensor arrangement may comprise a strain gauge sensor.

Additional possible features and preferred embodiments are set out and disclosed in the following.

BRIEF DESCRIPTION OF THE DRAWINGS

The invention and further advantages thereof will now be described in more detail with reference to the accompanying drawings.

DETAILED DESCRIPTION OF THE INVENTION

Figure 1:
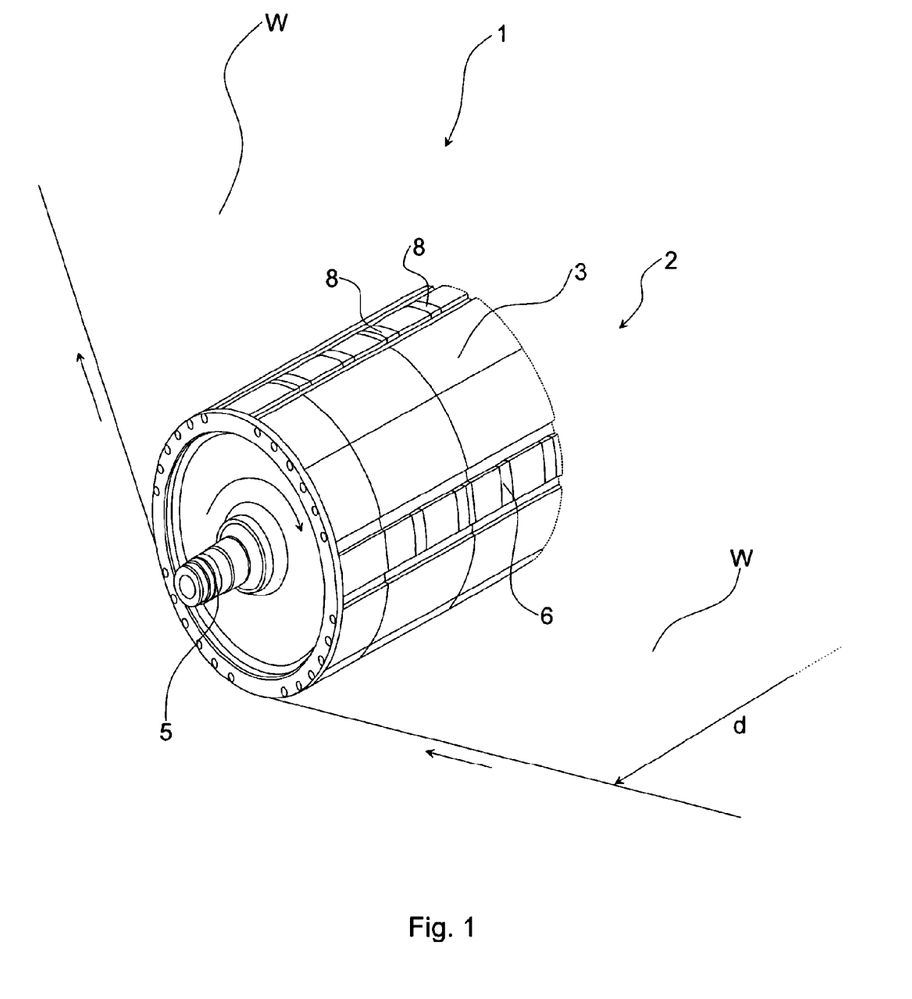
FIG. 1 is a perspective view of a portion of a roll arrangement according to an embodiment of the invention.

FIG. 1 shows a portion of a roll arrangement 1. The complete roll arrangement is not shown as its size would obscure the details of the roll arrangement when scaled down. The portion which is not shown in FIG. 1, however, has the same design as the illustrated portion of the roll arrangement 1.

Figure 2:
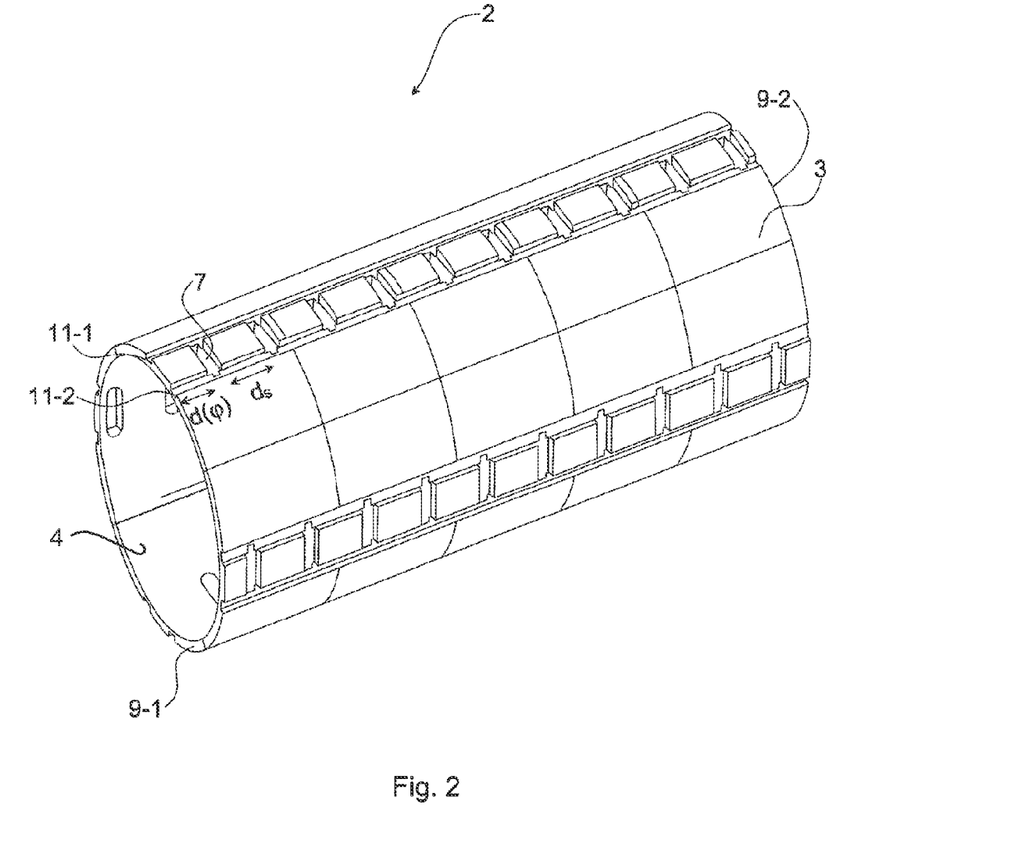
FIG. 2 is a perspective view of a roll of the roll arrangement shown in FIG. 1.

The roll arrangement 1 comprises a roll 2 having a peripheral surface 3 provided with a plurality of openings 7, as shown in FIG. 2, and a plurality of sensor arrangements 8 arranged in the openings 7. The roll 2 may be manufactured from e.g. steel or any similar metal, or of a composite material.

Figure 4A:
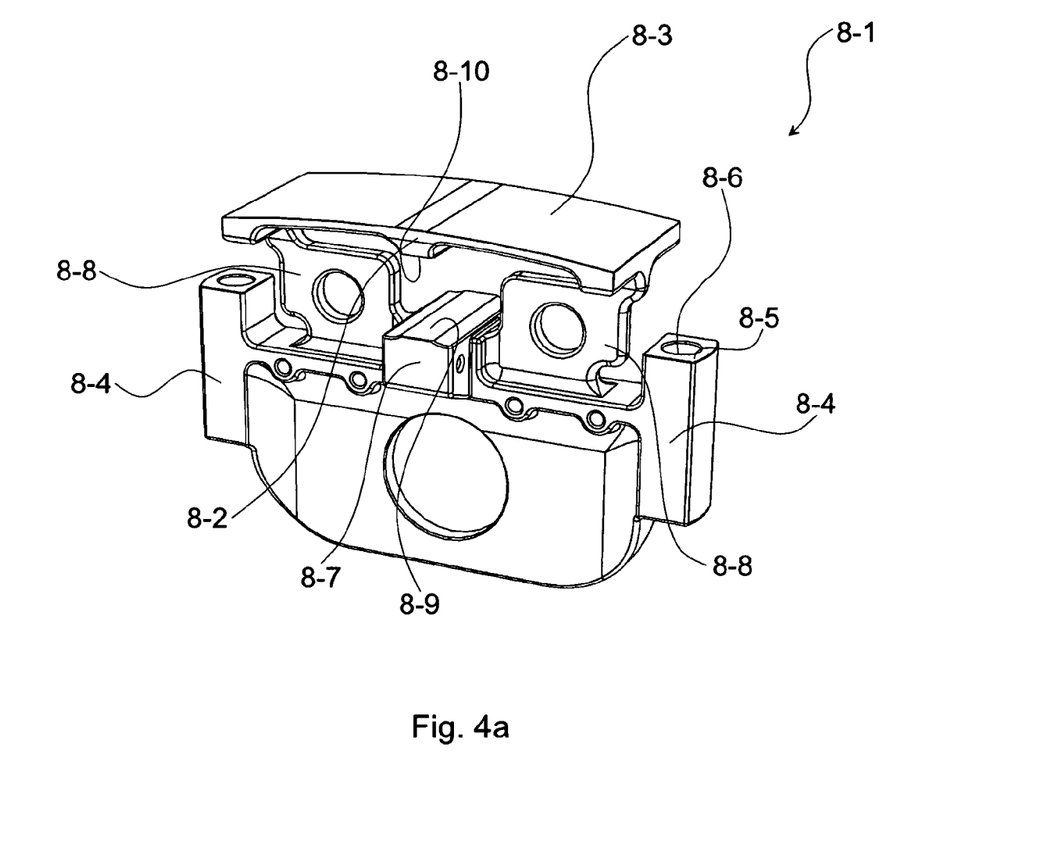
FIG. 4A is a perspective view of a sensor housing.
Figure 4B:
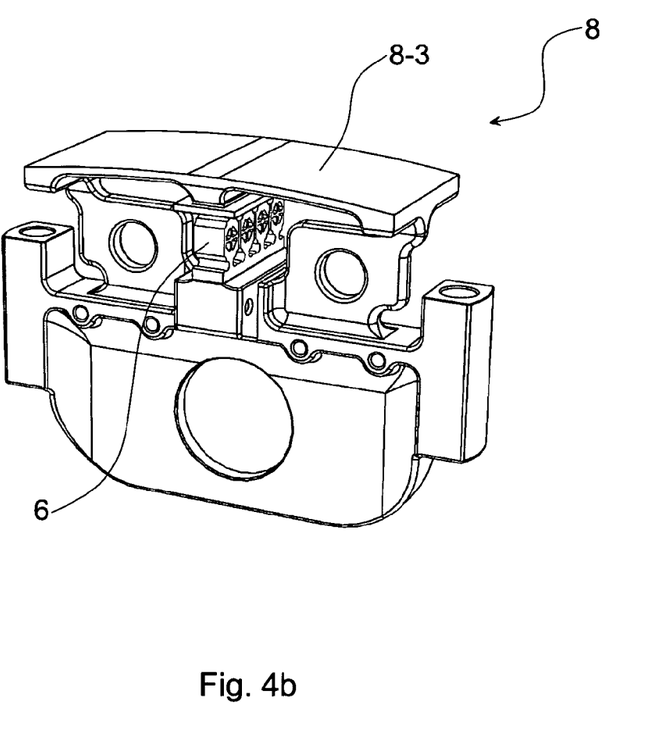
FIG. 4B is a perspective view of the sensor housing in FIG. 4a with sensors arranged therein.

In a typical embodiment, the sensor arrangements 8 comprise a sensor housing 8-1 and a sensor 6, as shown in FIG. 4b. The sensor housing 8-1 has a sensing surface 8-3 which, when the sensor arrangement 8 is arranged in an opening 7, is substantially flush with the peripheral surface 3 of the roll 2.

Returning to FIG. 1, the roll arrangement 1 further comprises a shaft 5 which serves as a rotational axis for the roll 2. Thus, the roll 2 is arranged around the shaft 5 around which the roll 2 may rotate when in operation.

In operation, a portion of the peripheral surface 3 is typically contacting, or at least guiding, a web W such as paper or a similar paper based product e.g. paper board or tissue. The web may also be plastic, textile or metal strip or foil. As the roll 2 rotates, the web W contacts the envelope surface of the roll 2. The speed with which the web W travels and the rotational speed of the roll 2 are typically synchronized. Thereby tears in the web W as well as jamming of the web W may be avoided.

The roll arrangement 1 is generally utilized for altering a traveling direction of the web W. The web W is hence turned around the shaft 5 of the roll arrangement 1 when the roll 2 rotates. As the web W contacts the peripheral surface 3 of the roll 2, the web W applies forces to the peripheral surface 3 across the width d of the web W. The configuration of the sensor arrangements 8 provides for the detection of these forces, herein referred to as the web tension profile of the web W.

FIG. 2 shows a perspective view of an example of the roll 2. As already stated above, the roll 2 in FIG. 2 for clarity only shows a portion of a complete roll. The complete roll 2 is tubular and has a first end 9-1 and a second end 9-2 opposite the first end 9-1, as schematically illustrated.

The roll 2 presents a peripheral surface 3 which is provided with a plurality of openings 7. The openings 7 are arranged in a plurality of rows R-1, R-2, R-3, R-4. The rows R-1, R-2, R-3, R-4 are arranged along the peripheral surface 3 of the roll 2. Each row R-1, R-2, R-3, R-4 extends axially with respect to the roll 2. Each row R-1, R-2, R-3, R-4 extends from the first end 9-1 to the second end 9-2 of the roll 2. The rows R-1, R-2, R-3, R-4 are angularly displaced relative each other.

It is however to be understood that the openings may be arranged in any formation, such as for instance in a helical formation or any other suitable formation which allows the detection of the web tension profile, as would be apparent to the skilled person in the art. Furthermore, the roll is not limited to having four rows of openings as exemplified above; the roll may be provided with more rows or fewer rows than four. The number of rows is typically determined by the physical dimension of the roll. For a very wide roll for e.g. paper manufacturing, the roll may be provided with e.g. four rows as described above. However, narrower rolls for e.g. printing applications may be provided with a plurality of rows, said plurality of rows being e.g. more than four.

In the exemplified embodiment, the openings 7 extend from the outer peripheral surface 3 to an inner peripheral surface 4 of the roll 3. Thus, the openings 7 are through openings, extending through the roll body. However, it is envisaged that in one embodiment the openings may be recesses which are not extending through the roll.

The roll 3 further comprises cable channels 11-1 and 11-2 in which cables can be provided for linking the sensors 6 to a computing device (not shown) to evaluate sensor measurement data.

Figure 3A:
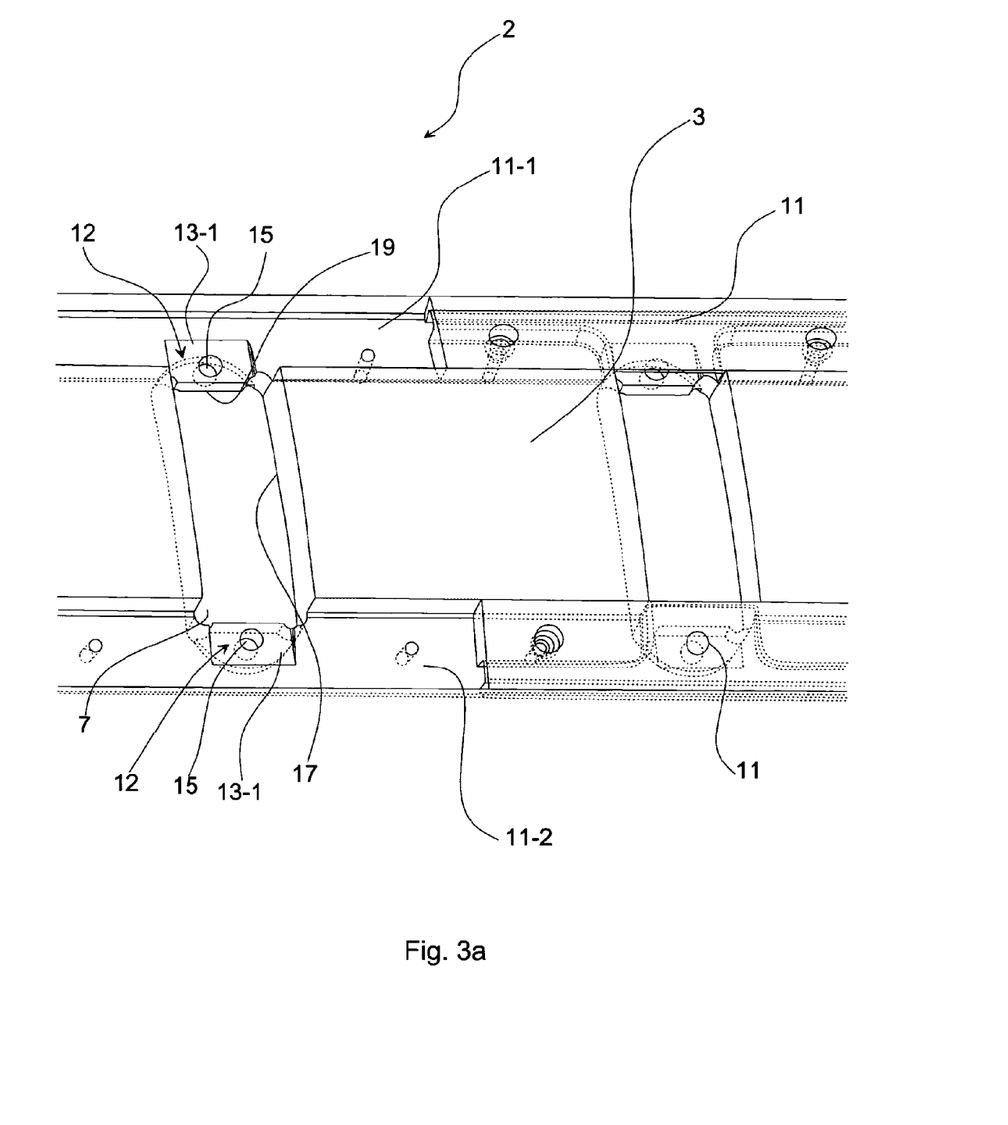
FIG. 3A is a perspective view of a portion of the outer peripheral surface of the roll in FIG. 2.

FIG. 3a shows a portion of the outer peripheral surface 3 of the roll 2 in FIG. 2. In particular, two openings 7 and a portion of the cable channels 11-1 and 11-2 without their respective cover 11 are shown. Sensor arrangement suspending means 12 of the roll 2 are thereby disclosed for the leftmost opening 7. Each opening 7 is however provided with a similar sensor suspending means to suspend a sensor arrangement 8.

Each opening 7 has an axial extension 19 and a tangential extension 17. The tangential extension 17 of the opening 7 is greater than the axial extension 19 of the opening 7. In the present example, the tangential extension 17 may be several times greater than the axial extension 19. A roll design where the tangential extension of the openings is greater than the axial extension of the openings provides for less thermal expansion effects and less axial deflection effects sensed by a sensor placed in the opening because said effects are normally greater in the axial direction of the roll. Further, the axial resolution of the sensors may be higher by providing openings and sensor arrangements with dimension where the axial extension is less than the tangential extension.

Figure 3B:
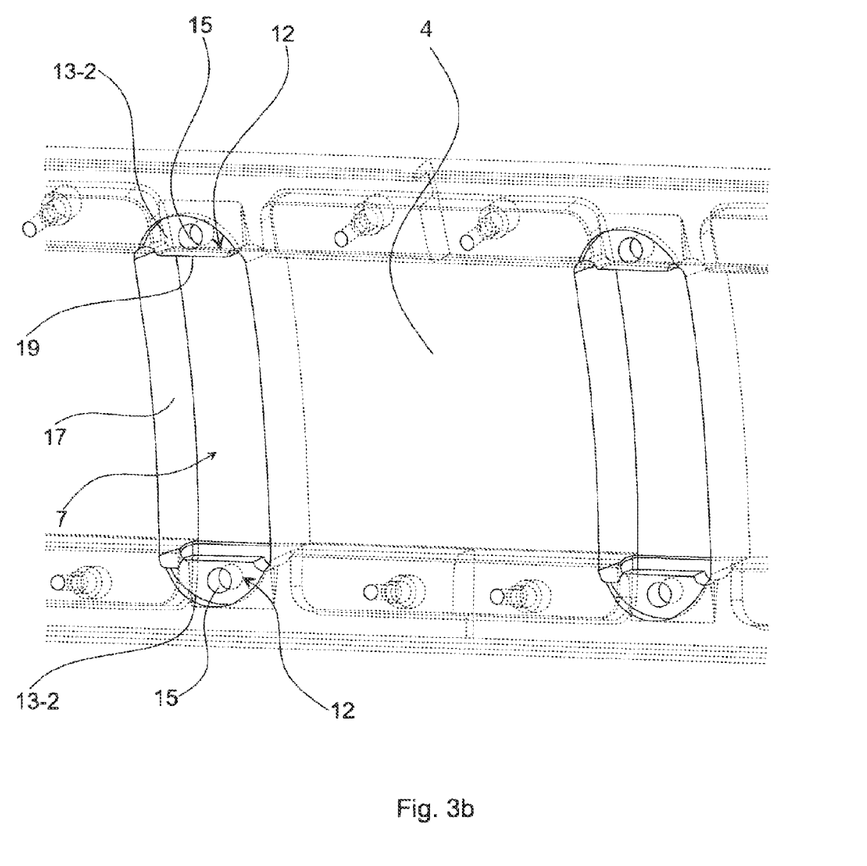
FIG. 3B is a perspective view of a portion of the inner peripheral surface of the roll in FIG. 2.

The sensor arrangement suspending means 12 associated with the opening 7 are arranged on each axial extension 19 side of the opening 7. Each sensor arrangement suspending means 12 comprises first surfaces 13-1 facing the same direction as the outer peripheral surface 3. Each sensor suspending means 12 also has second surfaces 13-2, as shown in FIG. 3b. which are facing in the opposing direction relative their corresponding first surfaces 13-1. The second surfaces 13-2 are part of the inner peripheral surface 4 of the roll 2, as shown in FIG. 3b. Each first surface 13-1 and corresponding second surface 13-2 are parallel.

The sensor arrangement suspending means 12 for each opening 7 are arranged in a plane defined by a cross section of the substantially cylindrical roll 2. In particular, the sensor arrangement suspending means 12 are arranged on opposite sides of the opening 7. As has been elaborated above, the presently disclosed embodiment provides two points of contact for suspending the sensor arrangement 8.

Through openings 15 are extending between each first surface 13-1 and corresponding second surface 13-2.

FIG. 3b shows a view of a portion of an inner peripheral surface 4 of the roll 2, as seen from the inside of the tubular roll 2.

The through openings 15 may in one embodiment be treaded. Threaded screws or unthreaded bolts may be led through the openings 15 fastened by means of fasteners, such as e.g. nuts.

The through openings 15 are for fastening lateral portions of a sensor housing 8-1 to the roll 2. The sensor arrangement 8 may thereby be suspended to the roll 2, as shown in FIG. 4d.

FIG. 4a shows a perspective view of an example of a sensor housing 8-1 having a main body and a sensing member 8-2. The sensing member 8-2 has a sensing surface 8-3. The sensor housing 8-1 comprises a rigid material, such as steel or a similar metal, for making the sensor housing 8-1 stiff. The sensor housing 8-1 further has a base member 8-7 and bridge members 8-8. The bridge members 8-8 mechanically couple the sensing member 8-2 to the base member 8-7.

In one embodiment it is envisaged that the sensing member is mechanically coupled to the remaining portions of the sensor housing only via the bridge members and the sensor.

The base member 8-7 presents an inner surface 8-9 and the sensing member 8-2 presents an outer surface 8-10. The inner surface 8-9 and the outer surface 8-10 are aligned and arranged at different radial distances from the center of the roll.

The base member 8-7 is in the exemplified embodiment arranged at equal distance from the lateral suspending means 8-4. Thus, the base member is arranged centered between the suspending means 8-4. Thereby the sensor 6 is arranged in a centered position in the sensor housing 8-1.

FIG. 4b shows a sensor arrangement 8. The sensor arrangement 8 comprises the sensor housing 8-1 and a sensor 6. The sensor housing 8-1 is adapted to house the sensor 6. The sensor 6 which is arranged in the sensor housing 8-1 is in contact with the sensing member 8-2. Thereby, the sensor 6 can sense when the sensing surface 8-3 is subject to forces from the web W.

Referring back to FIG. 4a, the sensor housing 8-1 further has suspending means 8-4. The suspending means 8-4 are arranged laterally in the same plane in the present example. The suspending means 8-4 have roll contact surfaces 8-5 for abutting against second surfaces 13-2 of an opening 7 when the main body 8-1 is fastened to the roll 2. The roll contact surfaces 8-5 are provided with suspending means openings 8-6. Hence, the sensor arrangement 8 can be suspended to the roll 2 by means of fasteners e.g. screws or bolts arranged in the suspending means openings 8-6 and through openings 15.

The sensing surface 8-3 is dimensioned so as to fit in an opening 7. To this end, the sensing surface 8-3 has a tangential extension which is greater than its axial extension.

Figure 4C:
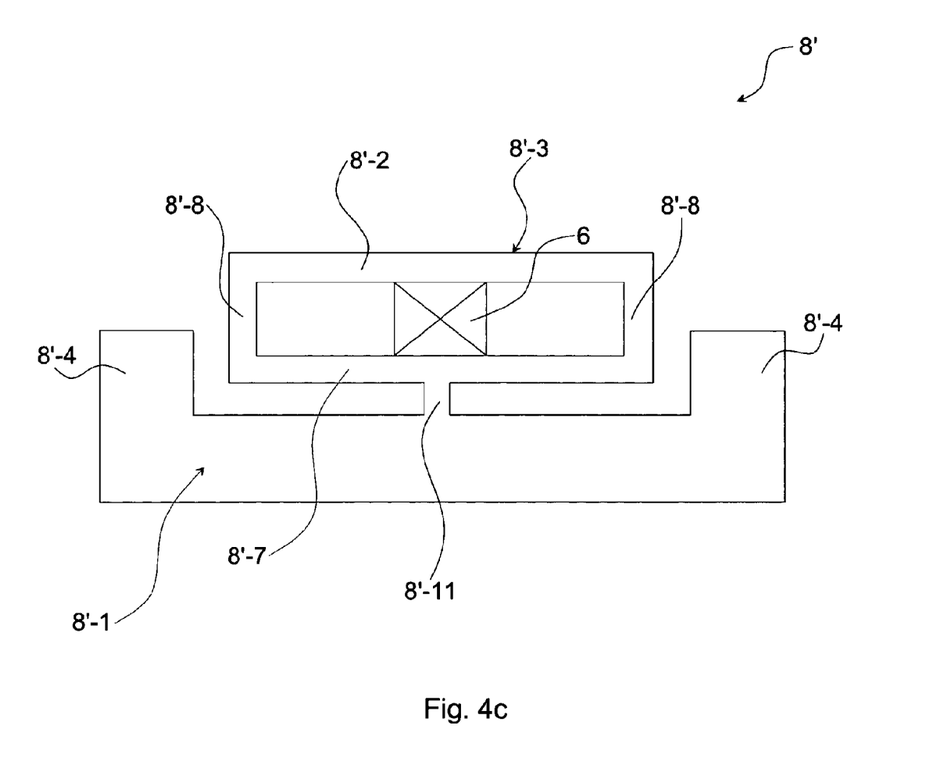
FIG. 4C is a schematic side-view of an example of a sensor arrangement.
Figure 4D:
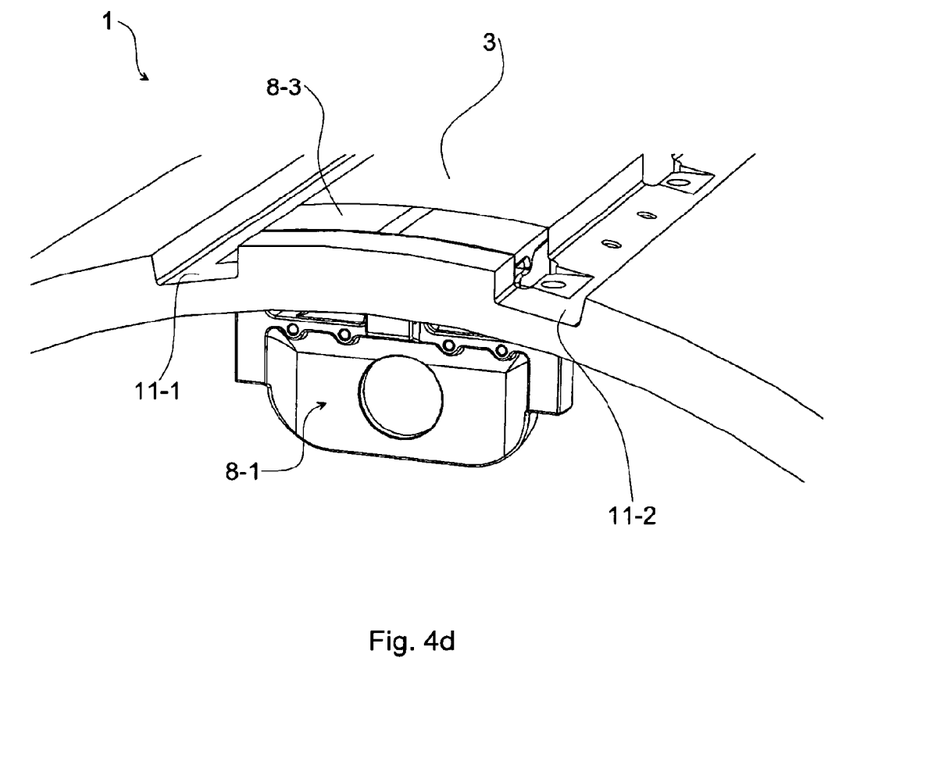
FIG. 4D is a perspective view of the roll arrangement in FIG. 1 with the sensor housing in FIG. 4a arranged in an opening of the roll.

FIG. 4c shows a schematic side-view of another example of a sensor arrangement 8'. The sensor arrangement 8' has a sensor housing 8'-1 comprising lateral suspending means 8'-4, a sensing member 8'-2 presenting a sensing surface 8'-3, and bridge members 8'-8. The bridge members 8'-8 mechanically couple the sensing member 8'-2 to the lateral suspending means 8'-4 by means of bridge means 8'-11. The bridge means 8'-11 supports a base member 8'-7 on which the sensor 6 is arranged when the sensor 6 is arranged in the sensor housing 8'-1. The bridge means 8'-11 serves to mechanically disengage the sensing member 8'-2 and a sensor 6 arranged in the sensor housing 8'-1 from the suspending means 8'-4.

Referring back to FIG. 2, an example of a roll design will now be described in more detail. However, as already noted above, the layout of the openings in the peripheral surface of the roll may have many different configurations within the scope of the appended claims.

Each row R-1, R-2, R-3, R-4 is associated with at least one cable channel. In the embodiment shown in FIG. 2, each row R-1, R-2, R-3, R-4 is associated with two cable channels 11-1 and 11-2. Each cable channel associated with a row is arranged parallel with that row. The cable channels allow for providing cabling to the openings 7 for connection to the sensors when arranged therein. Thereby the sensors may receive power from a power source. Further, the sensors may be able to provide signaling to a computing device (not shown), which signals relate to measured web tension forces for evaluating the web tension profile applied by the web to the peripheral surface 3 of the roll 2.

In the exemplified embodiment, each adjacent opening 7 in a row R-1, R-2, R-3, R-4 is equidistant. Hence a distance $d_s$ is constant between each adjacent opening 7 in a row.

In one embodiment, however, the openings may be distributed at different distances relative each other in each row. In such an embodiment, the distance between the adjacent openings may for instance be greater between openings close to the center of the roll compared to those openings which are arranged in the lateral portions of the peripheral surface of the roll. Thereby the measurement resolution will be greater in the end portions of the roll, which may be beneficial because the variations in web tension may typically arise in the lateral portions of the roll.

Further, the openings 7 of each row R-1, R-2, R-3, R-4 are axially displaced relative the openings 7 of any other row R-1, R-2, R-3, R-4 of the plurality of rows R-1, R-2, R-3, R-4. To this end, a distance $d(\phi)$ from the first end 9-1 to the first opening 7 in a row depends on the azimuthal with respect to a cylindrical coordinate system. The azimuthal is the variable which describes the angle in a cylindrical coordinate system.

In the exemplified roll 2, each adjacent row R-1, R-2, R-3, R-4 is angularly displaced approximately 90 degrees.

Each pair of rows R-1, R-3 and R-2, R-4 which are displaced approximately 180 degrees relative each other have an axial displacement relative each other which is less than the axial displacement of two adjacent rows.

Although the invention has been described with respect to a preferred embodiment, the person skilled in the art will realize that the present invention is by no means limited to the examples described above. On the contrary, many modifications and variations are possible within the scope of the appended claims. For instance, the openings in the roll may have any type of shape, such as being circular, elliptic, or rectangular with rounded corners. To this end, the shape of the sensors may be designed to match the shape of the openings.

What is claimed is:

1. A roll arrangement for determining a web tension profile of a web, the roll arrangement comprising:
   a roll having a peripheral surface for guiding the web, which peripheral surface is provided with a plurality of openings, and
   a plurality of sensor arrangements, each sensor arrangement being received in one of the plurality of openings to sense forces applied by the web to the roll, each sensor arrangement comprising a sensor and a sensor housing having a sensing surface that forms part of the peripheral surface of the roll when the sensor arrangement is arranged in an opening of the roll,
   the roll having suspension elements within each opening, each sensor arrangement having suspending means adapted to fasten to the suspension elements of one of the plurality of openings to suspend the sensor arrangement in the opening,
   wherein for each sensor arrangement and each opening, the suspending means and the suspension elements are disposed only within a plane perpendicular to a rotation axis of the roll.

2. The roll arrangement as claimed in claim 1, wherein for each sensor arrangement, the sensor is arranged centered between the suspending means in the sensor housing.

3. The roll arrangement as claimed in claim 1, wherein for each sensor arrangement, the sensor is arranged in the sensor housing between two facing surfaces that are aligned with each other and arranged at different radial distances from a center of the roll.

4. The roll arrangement as claimed in claim 3, wherein the sensor housing comprises a base member which includes an inner surface of the two facing surfaces, at least one bridge member, and a sensing member adapted to be in contact with the web, wherein the sensing member is mechanically coupled to the base member only via the at least one bridge member and the sensor.

5. The roll arrangement as claimed in claim 1, wherein the openings are arranged in a plurality of axially extending rows along the peripheral surface of the roll.

6. The roll arrangement as claimed in claim 5, wherein the rows are arranged around the peripheral surface in such a way that each pair of adjacent rows has the same angular displacement.

7. The roll arrangement as claimed in claim 5, wherein the openings of each row are axially displaced relative the openings of any other row of the plurality of rows.

8. The roll arrangement as claimed in claim 5, wherein the openings in each row are distributed from a first end of the roll to an opposite second end of the roll.

9. The roll arrangement as claimed in claim 1, wherein for each sensor arrangement, the sensing surface is substantially flush with the peripheral surface when the sensor arrangement is arranged in the respective opening.

10. The roll arrangement as claimed in claim 1, wherein each sensor arrangement comprises a magnetoelastic sensor.

11. The roll arrangement as claimed in claim 1, wherein for each sensor arrangement, the suspending means comprise lateral portions on opposing sides of the sensor arrangement.

* * * * *